United States Patent
Hirata

(10) Patent No.: US 9,250,841 B2
(45) Date of Patent: Feb. 2, 2016

(54) PRINT SERVER, CONTROL METHOD OF PRINT SERVER, AND STORAGE MEDIUM

(71) Applicant: CANON KABUSHIKI KAISHA, Tokyo (JP)

(72) Inventor: Kensuke Hirata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/686,605

(22) Filed: Apr. 14, 2015

(65) Prior Publication Data

US 2015/0301770 A1  Oct. 22, 2015

(30) Foreign Application Priority Data

Apr. 16, 2014  (JP) ................. 2014-084776

(51) Int. Cl.
  *G06F 15/00*  (2006.01)
  *G06F 3/12*  (2006.01)
  *G06K 1/00*  (2006.01)

(52) U.S. Cl.
  CPC ............ *G06F 3/1237* (2013.01); *G06F 3/1286* (2013.01)

(58) Field of Classification Search
  USPC .................................................. 358/1.1–1.18
  See application file for complete search history.

(56) References Cited

U.S. PATENT DOCUMENTS

| 8,755,074 B2 * | 6/2014 | Uotani | 358/1.15 |
| 2008/0123130 A1 * | 5/2008 | Matsumoto et al. | 358/1.15 |

FOREIGN PATENT DOCUMENTS

JP  2011-227624 A  11/2011

* cited by examiner

*Primary Examiner* — Douglas Tran
(74) *Attorney, Agent, or Firm* — Canon USA, Inc., IP Division

(57) ABSTRACT

When a print server according to the present invention receives a printing cancellation request from a load balancer, the print server acquires information of a print job as a target of the printing cancellation request and information of a printing device. Then, the print server determines whether a status of the acquired print job is a first status where printing cancellation processing is to be executed by a print server in charge of the printing device, a second status where the printing cancellation processing is to be executed by the printing device, or a third status where the printing cancellation request is to be handled as an error. Thereafter, the print server executes the printing cancellation processing according to the determination result.

7 Claims, 13 Drawing Sheets

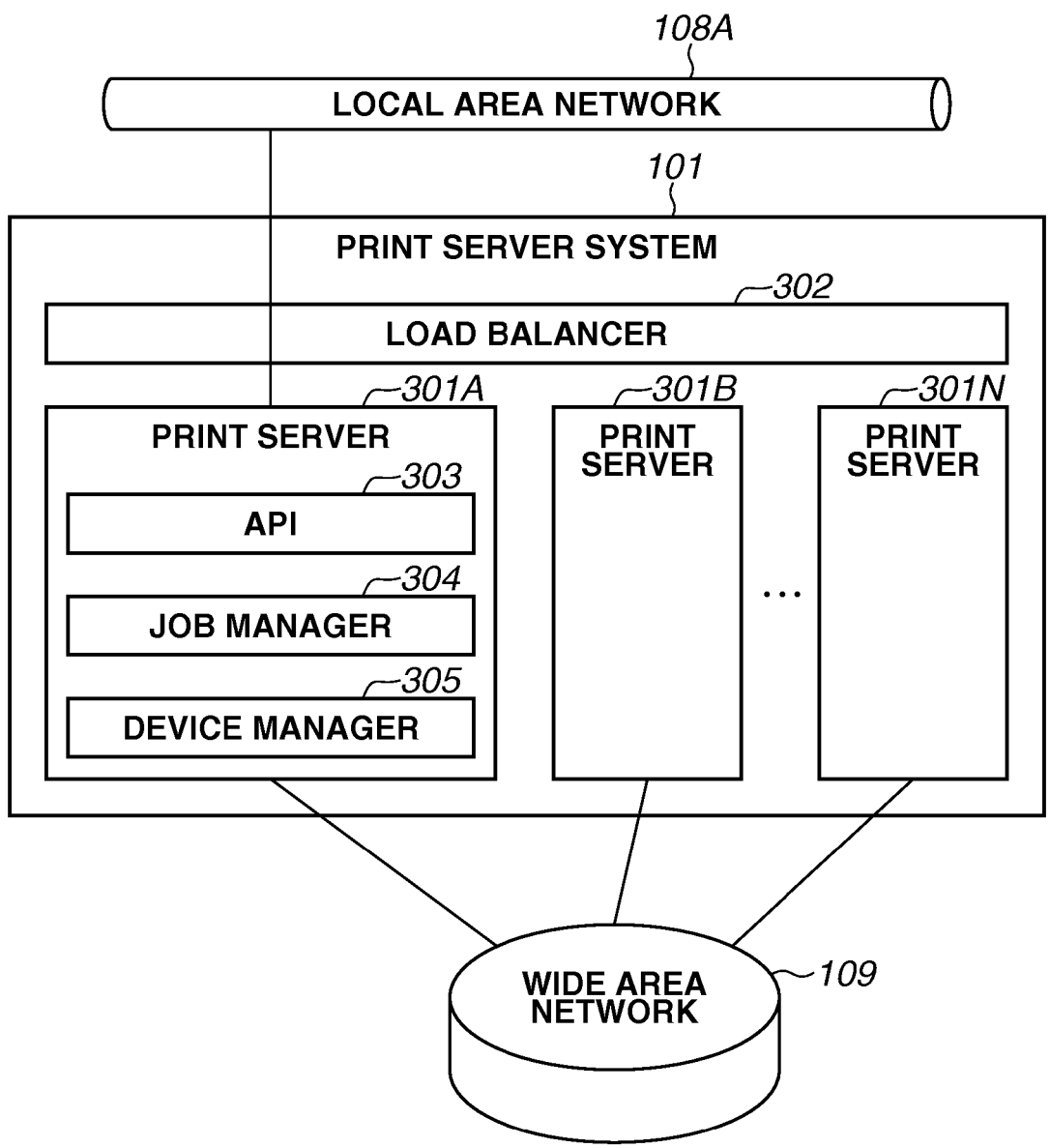

FIG.4

DOCUMENT TABLE (400)

| DOCUMENT ID (401) | DOCUMENT NAME (402) | USER NAME (403) | DATA PATH (404) |
|---|---|---|---|
| doc0001 | Document1 | user1 | C://user1/doc0001/doc0001.pdf |
| doc0002 | Document2 | user1 | C://user1/doc0002/doc0002.pdf |
| doc0004 | Document4 | user1 | C://user1/doc0004/doc0004.pdf |

JOB TABLE (410)

| JOB ID (411) | USER NAME (412) | DOCUMENT ID (413) | STATUS (414) | DEVICE JOB ID (415) | DEVICE ID (416) | CANCEL FLAG (417) |
|---|---|---|---|---|---|---|
| job0001 | user1 | doc0001 | PRINTED | devjob0001 | dev0001 | 0 |
| job0002 | user1 | doc0002 | PRINTING | devjob0002 | dev0001 | 0 |
| job0003 | user2 | doc0003 | PRINTING STAND-BY | devjob0003 | dev0001 | 1 |

DEVICE TABLE (420)

| DEVICE ID (421) | DEVICE NAME (422) | IP ADDRESS (423) | PORT NUMBER (424) | SCHEDULING MODE (425) | PRINT SERVER IN-CHARGE (426) |
|---|---|---|---|---|---|
| dev0001 | Printer1 | 192.168.0.1 | 9000 | DeviceScheduling | Printserver1.local |
| dev0002 | Printer2 | 192.168.0.2 | 9000 | ServerScheduling | Printserver2.local |
| dev0003 | Printer3 | 192.168.0.3 | 9000 | ServerScheduling | Printserver3.local |

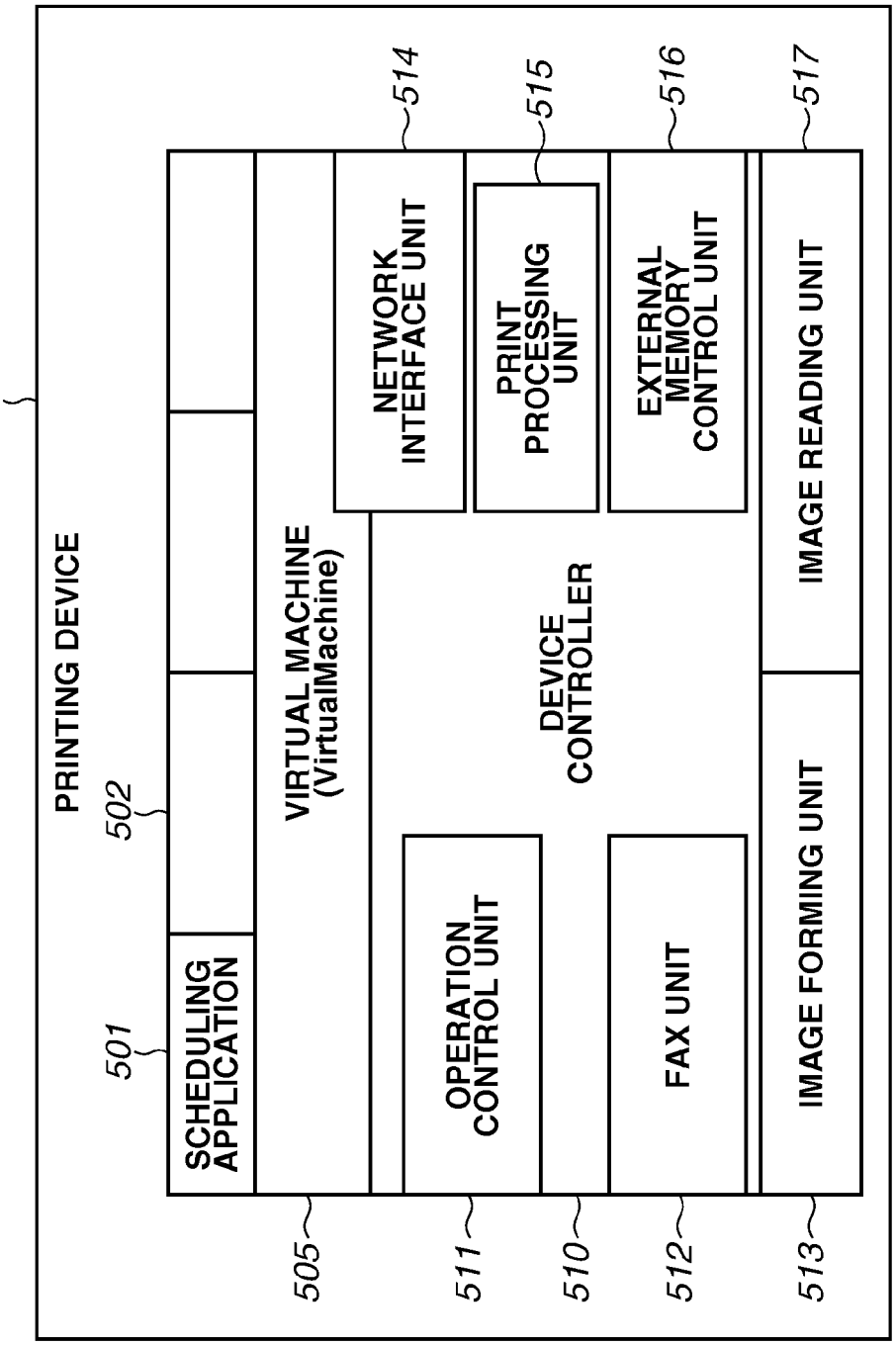

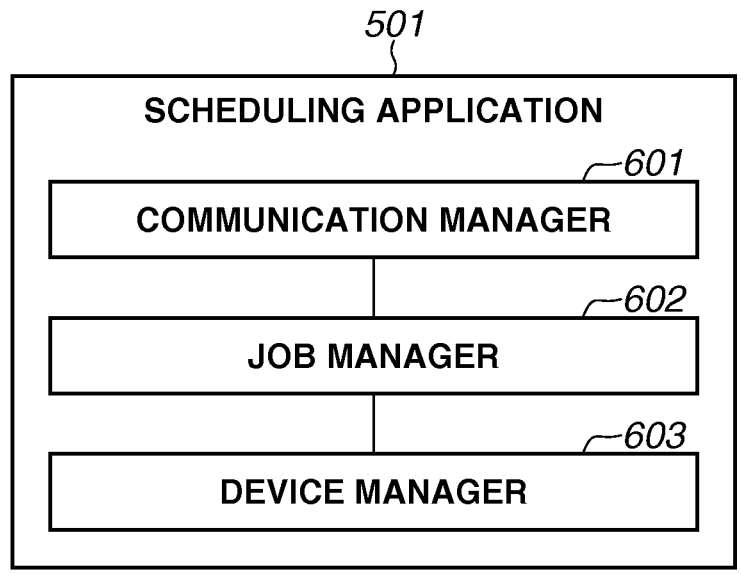

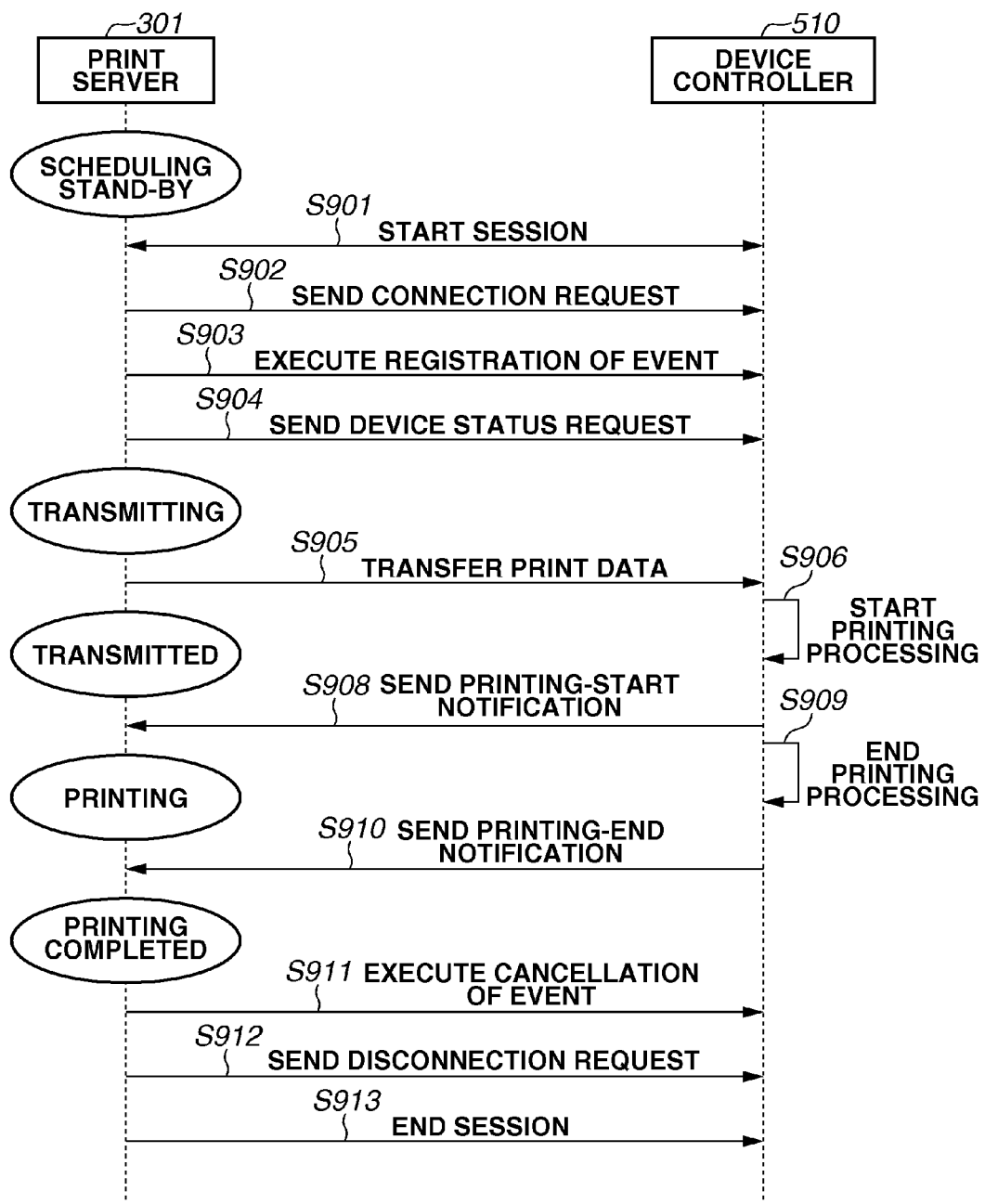

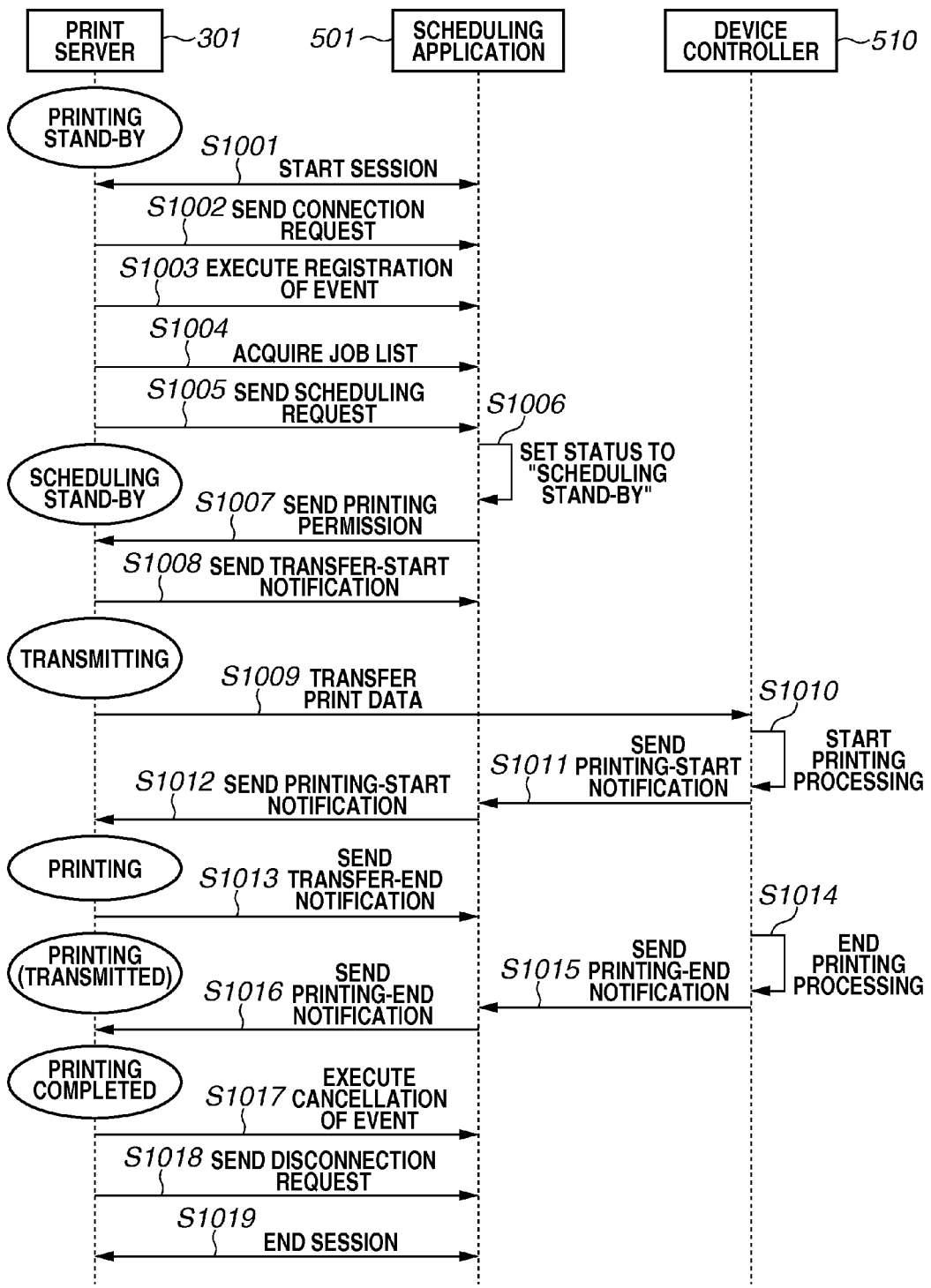

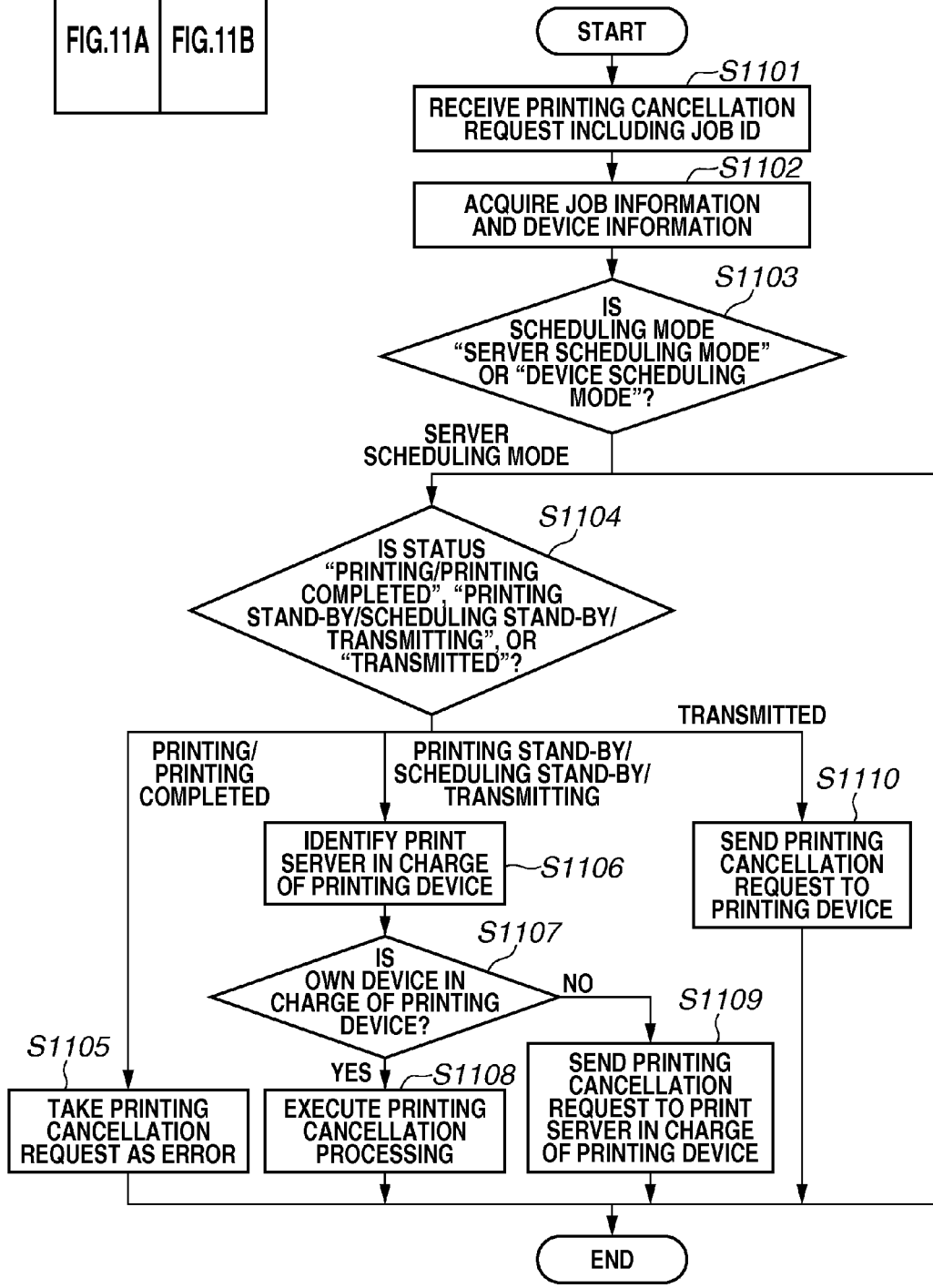

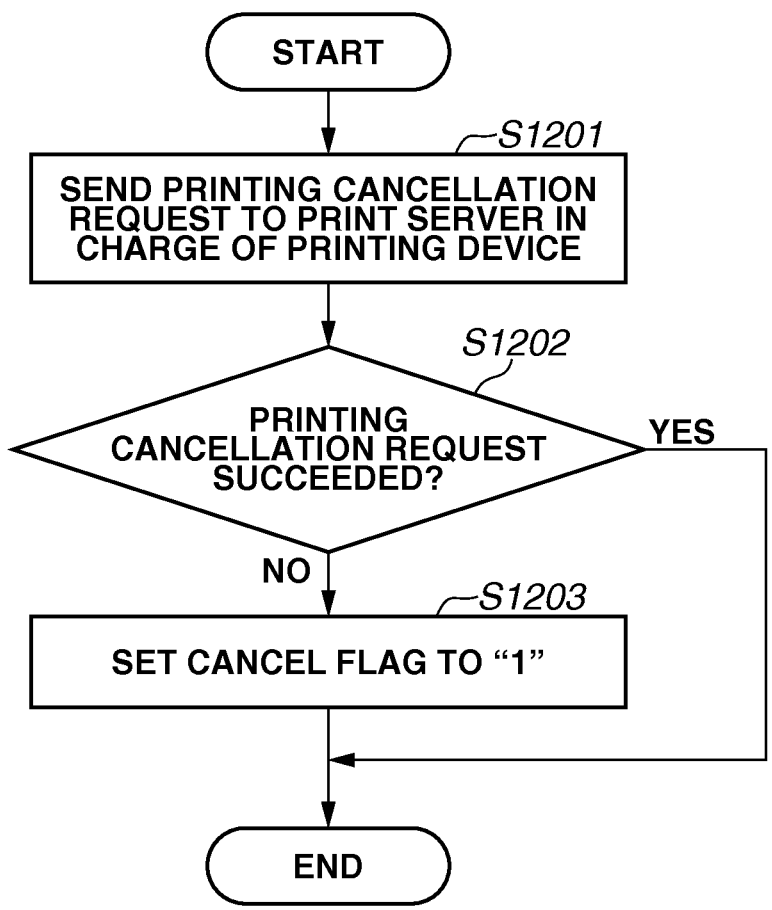

PRINT SERVER, CONTROL METHOD OF PRINT SERVER, AND STORAGE MEDIUM

BACKGROUND OF THE INVENTION

1. Field of the Invention

The present invention relates to a print server in a printing system which executes distributed processing of printing processing.

2. Description of the Related Art

There is provided a printing system in which a print server generates print data by receiving a printing request from a client, and then an image forming apparatus executes printing processing by receiving the print data. In the above-described printing system, for example, when the client sends a printing cancellation request, it is desirable that the print server promptly executes cancellation of the printing processing. However, if the print server exists in the internet over a firewall, the print server cannot notify the image forming apparatus of the cancellation of the printing processing. Therefore, Japanese Patent Application Laid-Open No. 2011-227624 discusses a technique for appropriately executing the cancellation of the printing processing by changing a determination of the printing cancellation processing according to a generation status or a transfer status of the print data.

With the widespread use of the above-described print server connected thereto via the internet, there has been provided a printing system which executes distributed processing of a print job by managing a number of printing devices with a plurality of print servers. In the printing system, printing requests are distributed to the print servers through a typical load distribution apparatus known as a "load balancer".

In the above-described distributed processing-type printing system, various requests received from a client are distributed to each of the print servers through the load balancer. Although the load balancer can allocate the requests to the print servers at high speed, it is not possible for the load balancer to execute complex processing such as controlling a printing order or identifying the print server that is processing a print job as a target of a printing cancellation request.

Accordingly, it can be considered that the load balancer is configured to distribute the printing cancellation request received from the client to each of the print servers as well. When the print server has received the printing cancellation request distributed by the load balancer, the print server has to transfer the printing cancellation request to the print server that is executing the processing of the print job as a target of that printing cancellation request. However, in the technique discussed in Japanese Patent Application Laid-Open No. 2011-227624, the printing cancellation request cannot be transferred because the distributed processing-type printing system is not taken into consideration.

SUMMARY OF THE INVENTION

According to the present invention, by appropriately managing the status of a print job, a distributed processing-type printing system appropriately executes printing cancellation processing by identifying a target to be notified of a printing cancellation request when the printing cancellation request is transmitted thereto.

A print server according to an exemplary embodiment of the present invention includes a receiving unit configured to receive a printing cancellation request from the load balancer, an acquisition unit configured to acquire information of a print job as a target of the printing cancellation request received by the receiving unit and information of a printing device, a determination unit configured to determine whether a status of the acquired print job is a first status where printing cancellation processing is to be executed by a print server in charge of the printing device, a second status where the printing cancellation processing is to be executed by the printing device, or a third status where the printing cancellation request is to be handled as an error, and a control unit configured to control the print server in charge of the printing device to execute the printing cancellation processing in a case where the determination unit determines that the status of the print job is the first status, control the printing device to execute the printing cancellation processing in a case where the determination unit determines that the status of the print job is the second status, and control the print server to send an error notification indicating that the printing cancellation processing cannot be executed in a case where the determination unit determines that the status of the print job is the third status.

Further features of the present invention will become apparent from the following description of exemplary embodiments with reference to the attached drawings.

BRIEF DESCRIPTION OF THE DRAWINGS

FIG. 3 is a block diagram illustrating a module configuration of a print server.

FIG. 4 is a diagram illustrating tables of information managed by a database management system (DBMS).

FIG. 5 is a diagram hierarchically illustrating a configuration of a printing device.

FIG. 6A is a block diagram illustrating a module configuration of a scheduling application, and FIG. 6B is a table illustrating scheduling information of the scheduling application.

FIG. 9 is a sequence diagram illustrating printing processing in a server scheduling mode.

FIG. 10 is a sequence diagram illustrating printing processing in a device scheduling mode.

FIG. 12 is a flowchart illustrating processing executed by the print server when printing cancellation processing is in failure.

DESCRIPTION OF THE EMBODIMENTS

<System Configuration>

Figure 1:
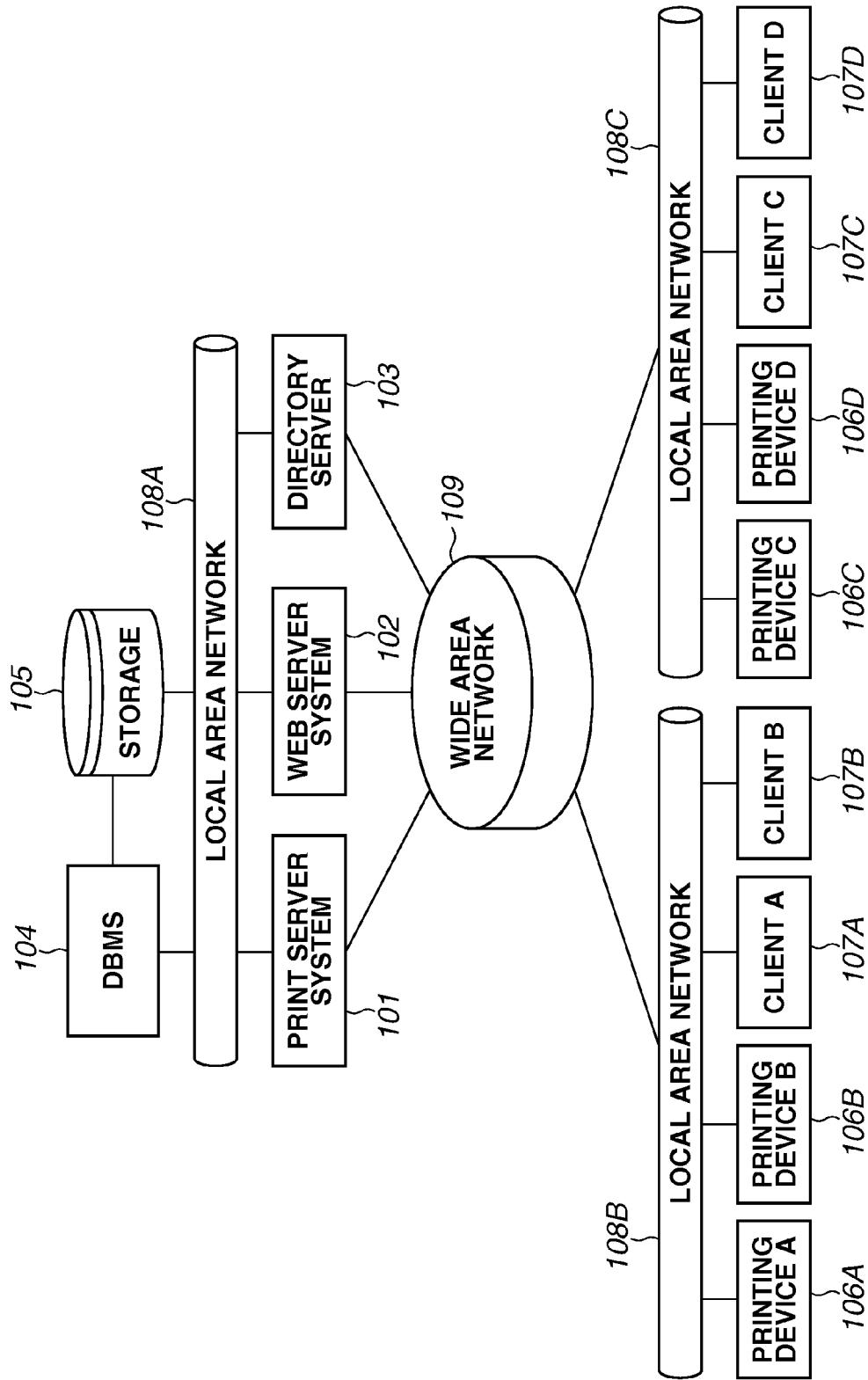
FIG. 1 is a block diagram illustrating a general configuration of an information processing system.

An exemplary embodiment of the present invention will be described below with reference to the drawings. FIG. 1 is a block diagram illustrating a general configuration of an information processing system according to the present invention. As illustrated in FIG. 1, the information processing system includes a server computer system for controlling the information processing system, a printing device, and a client computer. The server computer system, the printing device, and the client computer are widely connected to one another via a wide area network (hereinafter, referred to as "WAN") 109.

The server computer system includes a print server system 101, a Web server system 102, a directory server 103, a database management system (DBMS) 104, and a storage 105. The print server system 101 is a server computer system for executing various operations in the information processing system such as monitoring and managing the printing device, controlling and monitoring a print job, and transferring a print job to the printing device. The print server system 101 in a large-scale information processing system has a cluster structure or a redundant cluster structure in order to execute distributed processing of load. In other words, the print server system 101 functions as a printing system having a plurality of print servers. Further, the print server system 101 exchanges information such as print job data, printing control instructions, and a management-target print job by connecting to the DBMS 104 and the Web server system 102 via a local area network (hereinafter, referred to as "LAN") 108A.

The Web server system 102 transmits information about the print job managed by the print server system 101 and document information managed by the DBMS 104 to each front-end client 107 via the WAN 109. Normally, the Web server system 102 in a large-scale information processing system has a cluster structure or a redundant configuration in order to execute the distributed processing of load. Further, the Web server system 102 receives operations relating to the print job such as a printing instruction and a printing cancellation instruction from the client 107, and transfers the instructions to the print server system 101. Furthermore, the Web server system 102 cooperates with the directory server 103 to manage login authentication from the client 107.

The directory server 103 manages authentication of a user by using a combination of a user name and a password. Each piece of user information can participate in a domain group, and authority among users in the domain group can be set, for example, within a range different from a range of authority of a user as a single unit. Further, the user information can be designed to participate in a plurality of domain groups.

The DBMS 104 manages data such as a document table 400, a job table 410, and a device table 420 (described below with reference to FIG. 4) stored in the storage 105. The DBMS 104 executes operations for updating, acquiring, adding, and deleting various types of data by receiving the operations from other servers. Further, the DBMS 104 in a large-scale information processing system may have a cluster structure in order to execute the distributed processing of load, or a redundant system structure in order to prepare for occurrence of failures. Furthermore, the storage 105 may be directly connected to the DBMS 104 as a direct attached storage (DAS), or may be connected thereto as a storage area network (SAN) via the network.

Printing devices 106A, 106B, 106C, and 106D are image forming apparatuses for printing the print data received from a print server. Hereinafter, each of the printing devices 106A, 106B, 106C, and 106D is referred to as a printing device 106. Each printing device 106 is connected to a LAN 108B or a LAN 108C via a network interface (not illustrated). Further, the LANs 108B and 108C are connected to the WAN 109, so that the printing device 106 can communicate with the above-described print server system 101 via the LAN 108B or 108C and the WAN 109. A laser beam printer employing an electrophotographic system or an ink-jet printer employing an ink-jet system may be used for the printing device 106 as appropriate. Further, the printing device 106 includes a below-described scheduling application 501 for managing a printing schedule.

Clients 107A, 107B, 107C and 107D are client computers for executing information processing. Hereinafter, each of the clients 107A, 107B, 107C and 107D is referred to as a client 107. Each client 107 is connected to the LAN 108B or the LAN 108C via the network interface (not illustrated), so that the client 107 can communicate with various server systems via the WAN 109. The client 107 includes a Web browser so that a Web screen generated by the Web server system 102 can be displayed thereon. The user operates the Web screen displayed on the Web browser so that authentication with respect to the server system, a printing request, a printing cancellation request and so forth can be performed.

<Hardware Configuration>

Figure 2:
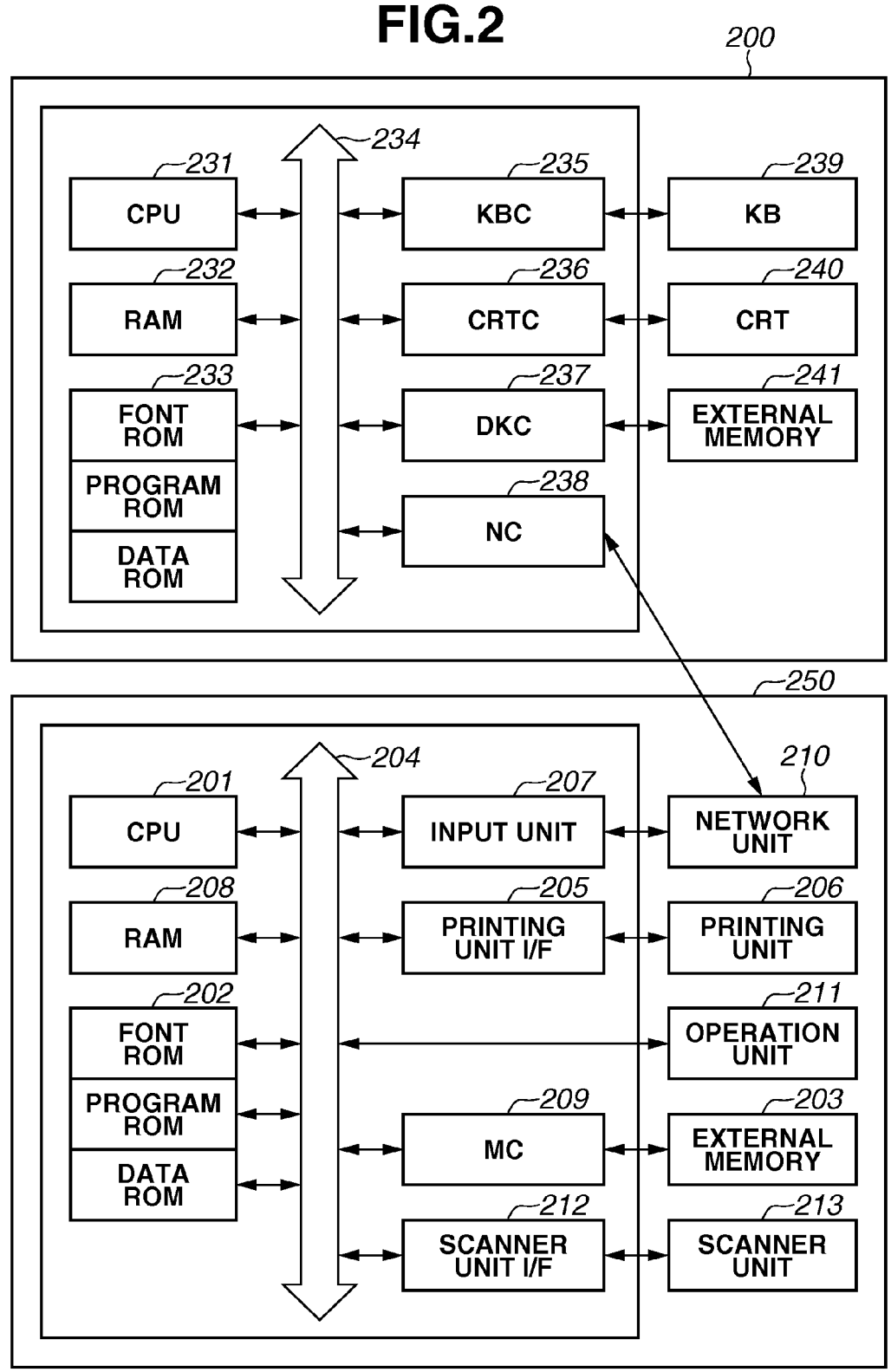
FIG. 2 is a block diagram illustrating a hardware configuration of respective devices.

An information processing system according to the present exemplary embodiment is realized on a system including a server and a printing device that have configurations as illustrated in FIG. 2. FIG. 2 is a block diagram illustrating a state where a print server 301 constituting the print server system 101 and the printing device 106 are communicably connected to each other via the WAN 109 and the LAN 108.

First, a hardware configuration 200 of the print server 301 will be described. The hardware block diagram illustrated in FIG. 2 corresponds to a hardware block diagram of a general information processing apparatus, and thus the hardware configuration of the general information processing apparatus can be employed for the print server 301 according to the present exemplary embodiment. In addition to the print server 301, the hardware configuration of the general information processing apparatus can be also employed for a Web server constituting the Web server system 102 and the client 107.

The hardware configuration 200 of the print server 301 includes a central processing unit (CPU) 231, a random access memory (RAM) 232, a read only memory (ROM) 233, a system bus 234, a keyboard controller (KBC) 235, a cathode-ray tube controller (CRTC) 236, a disk controller (DKC) 237, a network controller (NC) 238, a keyboard (KB) 239, a CRT display 240, and an external memory 241. The CPU 231 executes a program such as an operating system (OS) or an application program stored in a program ROM of the ROM 233 or the external memory 241 such as a hard disk (HD) by loading the program onto the RAM 232 to control each of blocks connected to the system bus 234. Various kinds of processing according to the present invention are realized by executing the above-described various programs.

The RAM 232 functions as a main memory or a work area of the CPU 231. A control program of the CPU 231 is stored in the program ROM within the ROM 233. Font data used for generating output information is stored in a font ROM within the ROM 233. When the print server 301 does not include the external memory 241 such as a hard disk, information transmitted or received to/from the printing device 106 is stored in a data ROM within the ROM 233. The KBC 235 controls a key input from the keyboard 239 or a pointing device (not illustrated). The CRTC 236 executes display control of the CRT display 240. The DKC 237 controls the access to data within the external memory 241 such as a hard disk which stores various kinds of data. The NC 238 executes communication control processing with respect to the printing device 106 or other devices connected thereto via the WAN 109 or the LAN 108.

In the below-described processing executed by the print server 301, the CPU 231 and the application program installed in the external memory 241 respectively take major roles in terms of hardware and software unless otherwise specified.

Next, a hardware configuration 250 of the printing device 106 will be described. The hardware configuration 250 of the printing device 106 includes a CPU 201, a ROM 202, an external memory 203, a system bus 204, a printing unit I/F 205, a printing unit 206, an input unit 207, a RAM 208, a memory controller (MC) 209, a network unit 210, an operation unit 211, a scanner unit I/F 212, and a scanner unit 213. The CPU 201 controls each of blocks connected to the system bus 204 by executing the control program stored in the ROM 202 or the external memory 203. An image signal generated by the processing of the CPU 201 is output to the printing unit 206 as output information via the printing unit I/F 205.

The scanner unit 213 optically reads a document image and inputs the read data to the control program via the scanner unit I/F 212. Further, the CPU 201 can execute communication processing with respect to the print server 301 via the input unit 207 and the network unit 210, so that the information within the printing device 106 can be notified to the print server 301.

A control program of the CPU 201 is stored in a program ROM within the ROM 202. Font data used for generating output information is stored in a font ROM within the ROM 202. When the printing device 106 does not include the external memory 203 such as a hard disk, information transmitted or received to/from the print server 301 is stored in a data ROM within the ROM 202.

The RAM 208 functions as a main memory or a work area of the CPU 201, and memory capacity thereof can be increased by an option RAM connected to an expansion port (not illustrated). Further, the RAM 208 is used as an output information rasterization region, an environmental data storage region, or a non-volatile random access memory (NVRAM).

The MC 209 controls the access to the external memory 203. The external memory 203 is connected thereto as an option in order to store font data, an emulation program, and form data. The operation unit 211 includes operation keys and a light-emitting diode (LED) display unit.

In the below-described processing executed by the printing device 106, the CPU 201 and the application program installed in the external memory 203 respectively take major roles in terms of hardware and software unless otherwise specified.

<Print Server System>

FIG. 3 is a block diagram illustrating a configuration of the print server system 101. As illustrated in FIG. 3, the print server system 101 includes a plurality of print servers 301 (i.e., 301A, 301B, and 301N) and a load balancer 302. The print server system 101 has a load distribution structure in order to support a large-scale printing system, and thus a plurality of print servers 301 is connected to the LAN 108A via the load balancer 302 serving as a switching mechanism for executing the distributed processing of load. The load balancer 302 serves as a load distribution apparatus for executing distributed processing in order to preferentially issue various requests to the print server 301 with less load by grasping the load status of the plurality of print servers 301. A distributed processing method may be a round robin method in which the request is simply allocated to each print server 301 in a sequential manner, or a method in which a prescribed request is periodically transmitted to each print server 301 to allocate the request to the print server 301 that has quickly returned a reply, although the distributed processing method is not limited to the above.

A configuration of the print server 301 will be described. The print server 301 includes an application programming interface (API) 303, a job manager 304, and a device manager 305. The API 303 receives a registration request of the document information from the Web server system 102 and various control requests relating to the print job such as a printing request and a printing cancellation request of the document. Further, the API 303 communicates with the DBMS 104 when registering the document information on the DBMS 104 or updating the job information stored in the DBMS 104 by receiving a printing request.

The job manager 304 manages the document information received by the API 303 by registering the document information on the document table 400 stored in the DBMS 104 via the API 303. When the API 303 receives a printing request, the job manager 304 acquires the document information to be printed and device information from the DBMS 104 via the API 303, and manages a print job by registering the job information on the job table 410. Further, the job manager 304 instructs the device manager 305 to print the acquired document information through the printing device 106 to perform printing.

When the device manager 305 receives a transmission request of the print data from the job manager 304, the device manager 305 starts communicating with the printing device 106 to sequentially execute the printing processing. The printing processing will be described below in detail. The device manager 305 manages the device table 420 stored in the DBMS 104 via the API 303.

FIG. 4 is a diagram illustrating the document table 400, the job table 410, and the device table 420 stored in the DBMS 104. The document table 400 managed by the job manager 304 includes a document identification (ID) 401, a document name 402, a user name 403, and a data path 404. When the print server 301 receives document data from the client 107, the print server 301 issues a document ID 401 capable of uniquely identifying the document data, and stores the document data in the data path 404. Specified values are respectively stored in the document name 402 and the user name 403 when the print server 301 receives the document data.

The job table 410 managed by the job manager 304 includes a job ID 411, a user name 412, a document ID 413, a status 414, a device job ID 415, a device ID 416, and a cancel flag 417. Upon receiving a printing request, the print server 301 issues a document ID 411 capable of uniquely identifying the print job. Specified values are respectively stored in the user name 412, the document ID 413, and the device ID 416 when the print server 301 receives the printing request. Further, the document ID 413 is associated with the document ID 401 stored in the document table 400, so that the values stored therein can be referred to each other.

The device ID 416 is associated with a device ID 421 stored in the device table 420, so that the values stored therein can be referred to each other. The status 414 represents a status of the print job, and execution statuses such as "printing stand-by", "scheduling stand-by", "transmitting", "transmitted", "printing", "printing completed", and "error-end" are stored therein. The transition of the status 414 will be described below. The device job ID 415 represents a job identifier issued by the scheduling application 501 within the printing device 106. The print server 301 can control the print job within the printing device 106 by using the device job ID 415. The cancel flag 417 indicates that the print job has been cancelled. The print server 301 cancels the print job without advancing the printing processing forward if the cancel flag 417 is valid (i.e., flag=1).

The device table 420 managed by the device manager 305 includes the device ID 421, a device name 422, an internet protocol (IP) address 423, a port number 424, a scheduling mode 425, and a print server in-charge 426. The printing device 106 can be uniquely identified by the device ID 421. The device name 422 represents a name of the printing device 106. The IP address 423 and the port number 424 represent destination information of the printing device 106, so that the print server 301 transmits the print data to the destination indicated by the IP address 423 and the port number 424.

The scheduling mode 425 indicates a management method for scheduling the transmission of print data executed by the print server 301. A server scheduling mode and a device scheduling mode are provided as the scheduling mode 425. In the server scheduling mode (server mode), the print server 301 manages the transmission of the print data to the printing device 106. In the device scheduling mode (device mode), the print server 301 transmits the print data to the printing device 106 according to an instruction of the scheduling application 501 of the printing device 106.

The printing processing executed in the above-described respective scheduling modes will be described below in detail. The print server in-charge 426 represents a host name of the print server 301 in charge of the printing processing executed by the printing device 106. If the plurality of the print servers 301 executes printing processing through a single printing device 106, a printing order thereof cannot be controlled. Therefore, a single print server 301 the host name of which is registered on the print server in-charge 426 takes charge of the printing processing executed by the printing device 106 in order to manage the printing order.

<Web Server System>

As described above, the Web server system 102 normally has a cluster structure in order to execute the distributed processing of load, and thus includes a plurality of Web servers. The Web server is software serving as a server for executing information communication processing in a world wide web (WWW) system. The Web server system 102 includes the following functions. When the front-end client 107 logs into the Web server system 102, the Web server system 102 requests the directory server 103 to execute authentication by acquiring user account information and a password thereof. When the log-in authentication has succeeded, the Web server system 102 acquires the information stored in the document table 400, the job table 410, and the device table 420 from the DBMS 104 and transmits the information to the log-in client 107 and the printing device 106. Further, upon the Web server system 102 receiving a printing instruction of a document from the client 107, the Web server system 102 transmits the printing instruction including the document ID attached thereto to the print server system 101. Upon receiving a printing cancellation instruction from the client 107, the Web server system 102 transmits the printing cancellation instruction including the job ID attached thereto to the print server system 101.

<DBMS>

The DBMS 104 stores the above-described document table 400, the job table 410, and the device table 420 as table information. For example, the DBMS 104 is used when the Web server system 102 acquires all of the document information conforming to a specified user name. Further, the DBMS 104 acquires the document information conforming to a specified document ID from the print server 301, or registers new document information from the print server 301. The print server 301 executes all the processing for referring to or updating the document table 400, the job table 410, and the device table 420 through the DBMS 104 although description thereof will be omitted.

<Printing Device>

FIG. 5 is a diagram hierarchically illustrating a software configuration of the printing device 106. As illustrated in FIG. 5, an image forming unit 513 controls processing for forming an image on a recording medium such as a recording sheet by executing a series of image forming processing such as sheet-handling processing, image transfer processing, and image fixation processing. An image reading unit 517 controls to read optically a document image using a scanner and to convert the read document image to digital image information. Further, the image reading unit 517 forms an image by outputting digital image information to the image forming unit 513, or transmits the digital image information via a communication line by outputting the digital image information to a fax unit 512 or a network interface unit 514.

A device controller 510 controls the respective operations executed by the image forming unit 513 and the image reading unit 517, for example, to copy the document information read by the image reading unit 517 by the image forming unit 513. Further, the device controller 510 includes the network interface unit 514, a print processing unit 515, the fax unit 512, and an operation control unit 511, and controls the information exchange executed among these units.

The fax unit 512 executes transmission and reception of a facsimile image. In other words, the fax unit 512 executes processing such as transmitting the digital image information read by the image reading unit 517 or decoding a received facsimile signal to record the decoded facsimile signal by the image forming unit 513.

The operation control unit 511 controls to generate a signal according to an operation of a user executed via an operation panel (or a display unit) that is provided on the printing device 106, and to display various kinds of data or messages on the operation panel. The print processing unit 515 controls to print print data input, for example, via the network interface unit 514 by processing and outputting the print data to the image forming unit 513. The network interface unit 514 controls transmission and reception of data with respect to other communication terminals via the communication line.

A virtual machine 505 is located at an upper level of the device controller 510 in the hierarchy, so that the device controller 510 can be controlled by the virtual machine 505. Further, the device controller 510 and the virtual machine 505 can directly use the network interface unit 514 to access the external network individually and independently.

Furthermore, applications described in a programming language supported by an API provided by the virtual machine 505 are located at an upper level of the virtual machine 505. These applications can indirectly act on the device controller 510 or operate the image forming unit 513 and the image reading unit 517 via the virtual machine 505.

In the present exemplary embodiment, the printing device 106 includes the scheduling application 501 as the application. The above-described applications can be uninstalled from the virtual machine 505 or newly installed on the virtual machine 505 as an application.

In the present exemplary embodiment, although the above-described applications have been described as the applications installed on the printing device 106, the applications may be provided as hardware. Alternatively, the applications may be provided as the applications installed on a computer serving as an external device communicably connected to the printing device 106.

After the image forming unit 513 has converted the image read by the image reading unit 517 into a data format that can be stored in an external storage device, an external memory control unit 516 stores the converted image data format in the external storage device. Further, the external memory control unit 516 reads the data stored in the external memory to execute printing processing through the image forming unit 513 or to externally transmit the data through the network via the network interface unit 514.

<Scheduling Application>

FIG. 6A is a block diagram illustrating a configuration of the scheduling application 501 whereas FIG. 6B is a table illustrating scheduling information 610 stored in the scheduling application 501. As illustrated in FIG. 6A, the scheduling application 501 includes a communication manager 601, a job manager 602, and a device manager 603. The communication manager 601 receives a request such as a connection request from the print server 301 and sends a notification relating to changes in a status of a print job notified from the device controller 510. A sequence of printing processing will be described below in detail.

The job manager 602 is a module for scheduling and managing the print jobs received from the print server 301 in order to control the print jobs to be sequentially processed according to the schedule. Settings for scheduling the print jobs can be changed by a user operation. Further, the job manager 602 controls the print jobs by receiving an instruction for controlling the print jobs (e.g., instruction for printing cancellation) from the print server 301. The device manager 603 is a module for communicating with the device controller 510, functioning as a driver for deleting a print job or grasping changes in the status of the print job.

The schedule information 610 illustrated in FIG. 6B includes a device job ID 611 and a status 612 of a print job. The device job ID 611 is issued as a job identifier when the scheduling application 501 receives a scheduling request of the print job. The status 612 represents a status of the print job notified to the print server 301 as an event according to transition of the status. Various statuses such as "scheduling stand-by", "transmitting", "transmitted", "printing", "printing completed", and "error-end" are set to the status 612 although the statuses are not limited to the above.

<Printing Processing Executed by Print Server>

Figure 7:
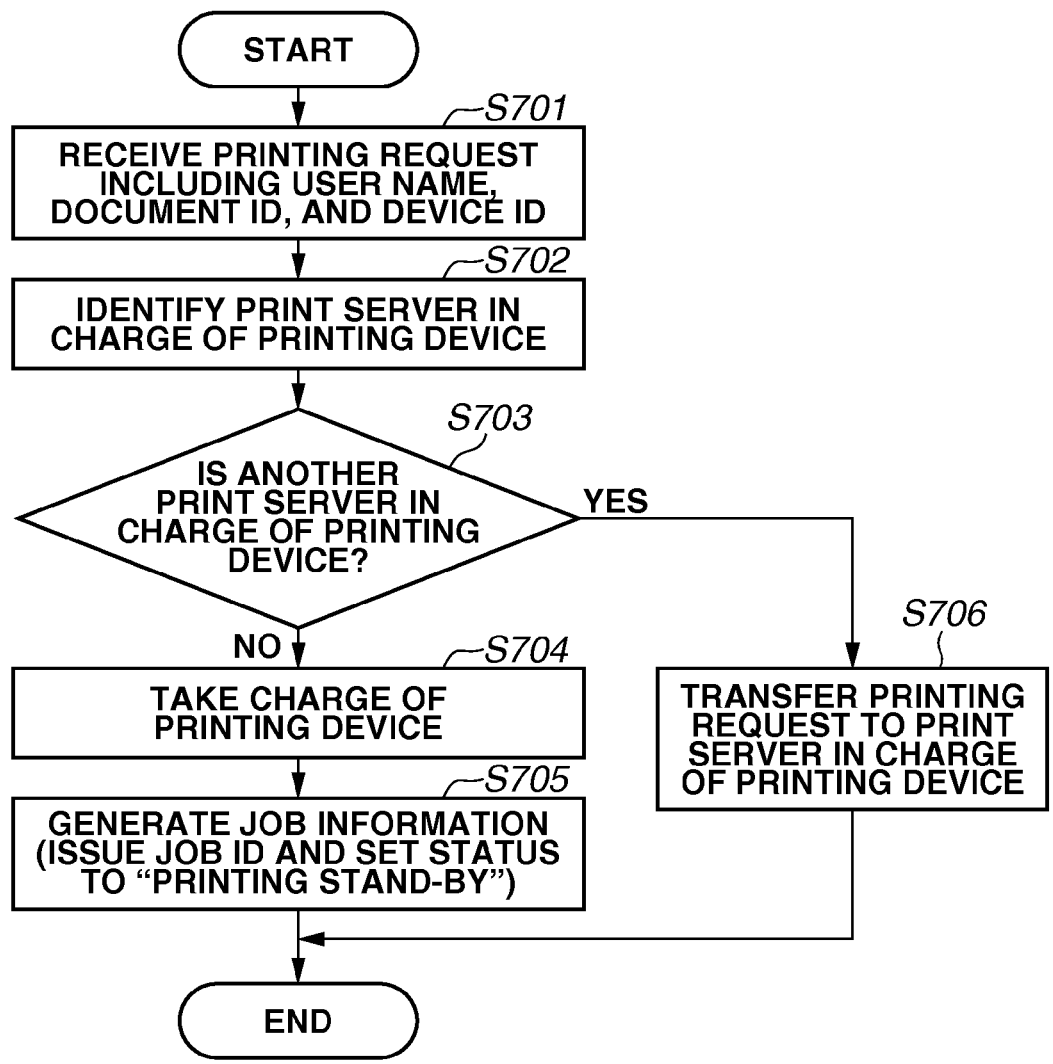
FIG. 7 is a flowchart illustrating processing executed by the print server when the print server receives a printing request.

Hereinafter, printing processing and a print job operation flow according to the present exemplary embodiment will be described with reference to FIGS. 7 to 12. FIG. 7 is a flowchart illustrating processing executed by the print server 301 when the print server 301 receives a printing request from the Web server system 102. In step S701, the print server 301 receives a printing request having the parameters such as a user name, a document ID of a printing-target document, and a device ID of the printing device 106. In step S702, the print server 301 acquires the device information a device ID of which conforms to the device ID included in the received printing request from the device table 420, and then, identifies a host name of the print server 301 in charge of the printing device 106 corresponding to the printing request from the print server in-charge 426.

In step S703, the print server 301 determines whether another print server 301 is in charge of the printing device 106. When the print server in-charge 426 is not empty or stores a host name other than its own host name, the print server 301 determines that another print server 301 is in charge of the printing device 106. For example, in a case where the print server in-charge 426 is empty (NO in step S703), the processing proceeds to step S704. In step S704, the print server 301 updates the print server in-charge 426 by using its own host name. Then, in step S705, the print server 301 issues a new job ID 411 and newly registers the job information on the job table 410.

The user name, the document ID, and the device ID included in the received printing request are stored as the user name 412, the document ID 413, and the device ID 416 of the newly-registered job information. The print server 301 sets the status 414 to "printing stand-by" while setting the cancel flag 417 to "0". In step S703, in a case where another print server 301 is in charge of the printing device 106 (YES in step S703), the processing proceeds to step S706. In step S706, the print server 301 transfers the printing request received in step S701 to the host name registered on the print server in-charge 426.

Figure 8:
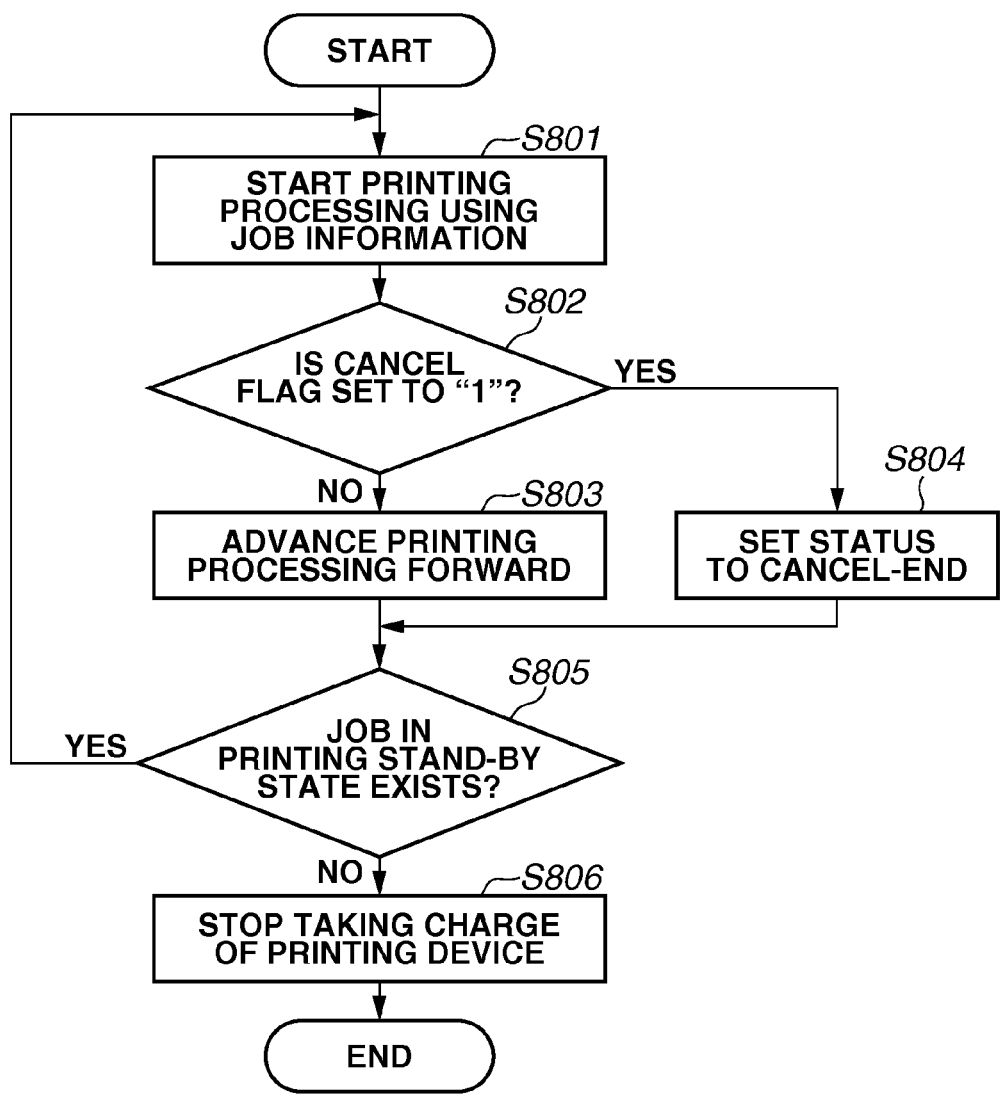
FIG. 8 is a flowchart illustrating printing processing executed by the print server.

FIG. 8 is a flowchart illustrating printing processing executed by the print server 301 in charge of the printing operation executed by the printing device 106. In a case where the print server in-charge 426 is empty in the above-described processing in steps S703 to S705, in other words, in a case where the printing operation of the printing device 106 has not started, in step S801, the print server 301 starts printing processing using the job information generated in step S705.

In step S802, the print server 301 determines whether the cancel flag 417 is set to "1". In a case where the cancel flag 417 is set to "1" (YES in step S802), the processing proceeds to step S804. In step S804, the print server 301 sets the status 414 to "cancel-end" without executing the printing processing. In a case where the cancel flag 417 is set to "0" (NO in step S802), the processing proceeds to step S803. In step S803, the print server 301 updates the status 414 to "scheduling stand-by" and advances the printing processing forward. In other words, in the status "scheduling stand-by", the printing processing has started while the cancel flag 417 is set to "0", so that the print job is ready to be executed according to the schedule. The printing processing varies according to scheduling modes, and thus description thereof will be given below in detail.

In step S805, the print server 301 determines whether a print job in a printing stand-by state exists in the job table 410. In a case where the job is newly registered on the job table 410 (YES in step S805), the processing proceeds to step S801. In step S801, the print server 301 starts the printing processing. In step S805, in a case where the new job is not registered on the job table 410 (NO in step S805), the processing proceeds to step S806. In step S806, the print server 301 makes the print server in-charge 426 of the device table 420 empty and stops taking charge of the printing device 106.

<Printing Sequence in Server Scheduling Mode>

A printing sequence of the print server 301 in a server scheduling mode will be described. FIG. 9 is a sequence diagram illustrating processing executed by the print server 301 and the device controller 510. Although it is not illustrated in FIG. 9, a printing request notified to the print server 301 includes a document ID and a device ID. Based on the notified document ID, the print server 301 acquires document information and document data saved in the data path 404 from the document table 400 of the DBMS 104. Further, the print server 301 executes the printing processing according to the following sequence by identifying the printing-target printing device 106 from the device ID.

In step S901, the print server 301 establishes a communication session with the device controller 510. The communication session is established by a communication protocol such as a transmission control protocol/internet protocol (TCP/IP) or a hyper-text transfer protocol (HTTP). In step S902, the print server 301 sends a connection request to the device controller 510. In step S903, the print server 301 registers an event on the device controller 510 in order to receive a notification when a status of a print job or the printing device 106 is changed.

In step S904, the print server 301 requests and acquires a device status from the device controller 510. In step S905, in a case where the device status indicates that the printing device 106 can execute printing, the print server 301 updates the status 414 to "transmitting" from "scheduling stand-by", and starts transferring print data. After transferring the print data, the print server 301 updates the status 414 of the job table 410 to "transmitted".

In step S906, the device controller 510 sequentially analyzes the received print data and starts the printing processing. Further, in step S908, the device controller 510 sends a printing-start notification indicating that the status of the printing device 106 is changed to "printing start" to the print server 301 on which the event has been registered. The print server 301 receives the printing-start notification and updates the status 414 of the job table 410 to "printing". Herein, the job ID 411 issued by the print server 301 is embedded in the print data transmitted to the device controller 510. When the device controller 510 sends the above notification, the job ID 411 is notified together with a job handle. The print server 301 can monitor the status of the print job by using the job ID 411. Further, the print server 301 saves the job handle notified from the device controller 510 in the device job ID 415. The print server 301 can execute control processing of the print job such as printing cancellation processing with respect to the device controller 510 by using the job handle.

In step S909, when the printing device 106 ends the printing processing, the processing proceeds to step S910. In step S910, the device controller 510 sends a printing-end notification to the print server 301 in a same manner as the processing for sending the printing-start notification. The print server 301 receives the printing-end notification and updates the status 414 of the job table 410 to "printing completed". Further, in step S911, the print server 301 cancels the event registered on the device controller 510 when the print jobs for all of the scheduled printing requests have been completed. Then, in step S912, the print server 301 sends a disconnection request to the device controller 510. The device controller 510 executes processing for ending the communication with the print server 301 when the event is cancelled and the disconnection request is transmitted thereto. Lastly, in step S913, the print server 301 ends the session established in step S901.

As described above, when the printing processing is executed in the server scheduling mode, the print server 301 makes a determination to transmit the print data by scheduling and monitoring the print job.

<Printing Sequence in Device Scheduling Mode>

A printing sequence in a device scheduling mode executed by the print server 301 and the scheduling application 501 will be described. FIG. 10 is a sequence diagram illustrating processing executed by the print server 301, the scheduling application 501, and the device controller 510. Although it is not illustrated in FIG. 10, the scheduling application 501 registers an event on the device controller 510 when the scheduling application 501 is activated. Accordingly, the device controller 510 notifies the scheduling application 510 of a status when the status of the print job or the device managed by the device controller 510 is changed.

A printing request notified to the print server 301 includes a document ID and a device ID. Based on the notified document ID, the print server 301 acquires document information and document data saved in the data path 404 from the document table 400 of the DBMS 104. The print server 301 executes printing processing according to the following sequence by identifying the printing-target printing device 106 from the device ID.

In step S1001, the print server 301 establishes a communication session with the scheduling application 501. The communication session is established by a communication protocol such as TCP/IP or HTTP. In step S1002, the print server 301 sends a connection request to the scheduling application 501. The scheduling application 501 receives the connection request through the communication manager 601. In step S1003, the print server 301 registers an event on the scheduling application 501 in order to receive a notification when the status of the print job or the printing device is changed.

In step S1004, the print server 301 requests and acquires a list of the scheduling information 610 currently managed by the job manager 602 of the scheduling application 501. In step S1005, the print server 301 issues a scheduling request of the print job to the scheduling application 501. The scheduling request includes job information of the print job as a printing target listed on the job table 410.

In step S1006, the scheduling application 501 receives the scheduling request, issues the device job ID 611, and sets the status 612 of the scheduling information 610 to "scheduling stand-by". In step S1005, after the scheduling request has been executed successfully, the print server 301 receives the device job ID 611 from the scheduling application 501 and stores the device job ID 611 in the device job ID 415 of the job table 410. Further, the print server 301 updates the status 414 to "scheduling stand-by".

The scheduling application 501 controls a printing order according to an order registered on the scheduling information 610. In step S1007, the scheduling application 501 notifies the print server 301 of a printing permission of the print job identified by the device job ID 611 by taking the device job ID 611 as a parameter. The print server 301 receives the printing permission and identifies the job information having the device job ID 415 conforming to the device job ID 611 included in the printing permission from the job table 410. In step S1008, the print server 301 sends a transfer-start notification to the scheduling application 501 based on the identified job information. Then, in step S1009, the print server 301 updates the status 414 to "transmitting" and starts transferring the print data. The scheduling application 501 receives the transfer-start notification in step S1008 and changes the status 612 of the scheduling information 610 to "transmitting".

In step S1010, the device controller 510 sequentially analyzes the received print data and starts the printing processing. Further, in step S1011, in order to change the status of the print job managed by its own device controller, the device controller 510 sends a printing-start notification indicating that the status is changed to "printing start" to the scheduling application 501 on which the event has been registered. After receiving the printing-start notification via the device manager 603, in step S1012, the scheduling application 501 sends the printing-start notification to the print server 301 by which the event has been registered. The print server 301 receives the printing-start notification and updates the status 414 of the job table 410 to "printing". As described above, the print server 301 can grasp the status of the print job whose printing processing has been executed by its own print server.

In step S1013, the print server 301 sends a transfer-end notification to the scheduling application 501 after transferring the print data. The scheduling application 501 receives the transfer-end notification and changes the status 612 of the scheduling information 610 to "transmitted" in a same manner as the processing for sending the transfer-start notification. At this time, the print server 301 does not update the status 414 of the job table 410 because the status thereof has already been updated to "printing".

After the printing device 106 ends the printing processing in step S1014, in step S1015, the device controller 510 sends a printing-end notification to the scheduling application 501 in a same manner as the processing for sending the printing-start notification. Similarly, in step S1016, the scheduling application 501 sends the printing-end notification to the print server 301 after receiving the printing-end notification. The print server 301 receives the printing-end notification and updates the status 414 of the job table 410 to "printing completed". Further, in step S1017, the print server 301 cancels the event registered on the scheduling application 501 when print jobs for all of the scheduled printing requests have been completed. Then, in step S1018, the print server 301 sends a disconnection request to the scheduling application 501. The scheduling application 501 executes processing for ending the communication with the print server 301 when the event is cancelled and the disconnection request is transmitted thereto. Lastly, in step S1019, the print server 301 and scheduling application 501 end the session established in step S1001.

As described above, when the printing processing is executed in the device scheduling mode, the scheduling application 501 schedules and monitors the print job. Then, the print server 301 starts transmitting the print data according to the notification from the scheduling application 501.

<Printing Cancellation Processing>

Figure 11B:
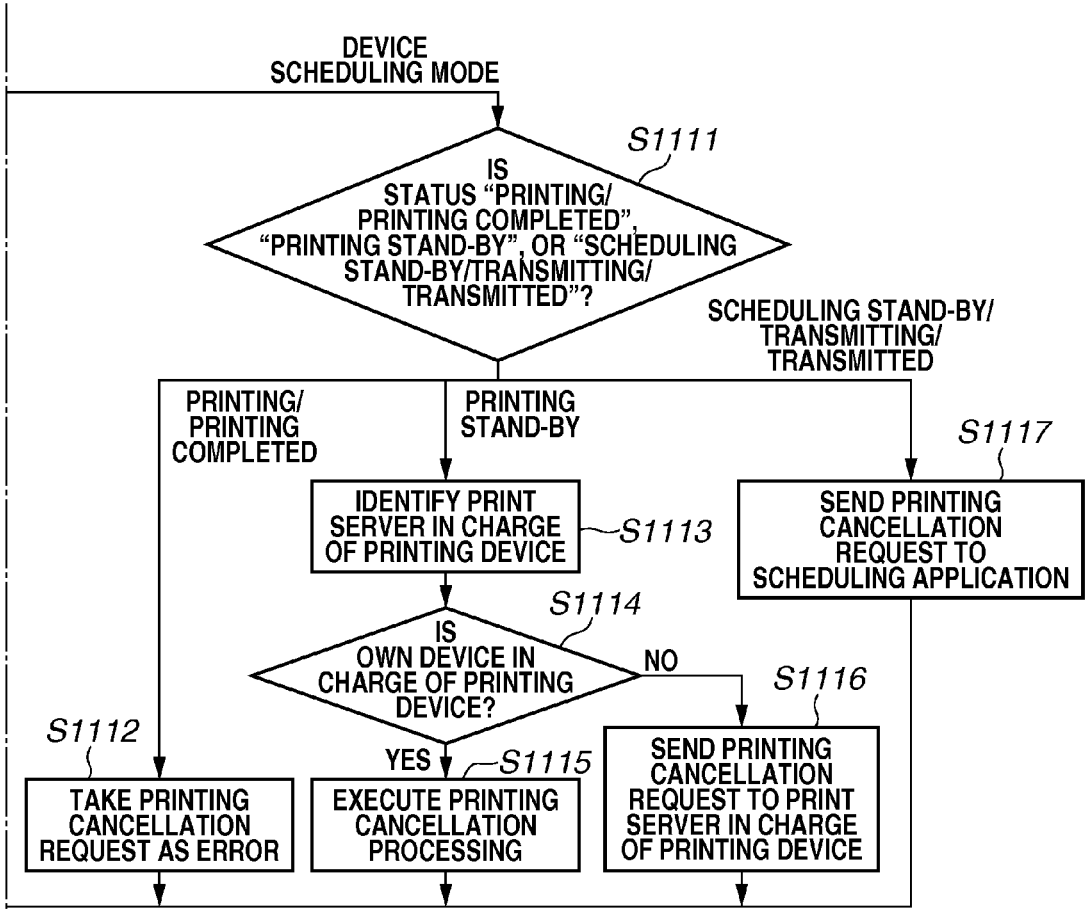
FIG. 11, composed of FIG. 11A and FIG. 11B, is a flowchart illustrating processing executed by the print server when the print server receives a printing cancellation request.

FIG. 11 is a flowchart illustrating processing executed by the print server 301 when the print server 301 receives a printing cancellation request from the Web server system 102 via the load balancer 302. In step S1101, the print server 301 receives a printing cancellation request including a job ID of a print job to be cancelled as a parameter from the load balancer 302. In step S1102, the print server 301 acquires job information from the job table 410 based on the job ID included in the printing cancellation request. In step S1102, the print server 301 further acquires device information from the device table 420 based on a device ID of the job information.

In step S1103, the print server 301 determines the scheduling mode 425 of the device information acquired in step S1102. In a case where the scheduling mode 425 is the server scheduling mode ("SERVER SCHEDULING MODE" in step S1103), the processing proceeds to step S1104. In step S1104, the print server 301 determines the status 414 of the job information acquired in step S1102. In step S1104, in a case where the status 414 is "printing" or "printing completed" ("PRINTING/PRINTING COMPLETED" in step S1104), the processing proceeds to step S1105. In step S1105, the print server 301 ends the processing by taking the printing cancellation request as an error, because the printing processing cannot be cancelled. In this case, the print server 301 may send an error notice to the requestor of the printing cancellation request.

In step S1104, in a case where the status 414 is "printing stand-by", "scheduling stand-by", or "transmitting" ("PRINTING STAND-BY/SCHEDULING STAND-BY/TRANSMITTING" in step S1104), the processing proceeds to step S1106. In step S1106, the print server 301 identifies the print server 301 in charge of the printing device 106 by referring to the print server in-charge 426. In step S1107, the print server 301 determines whether the own device(print server) is in charge of the printing device 106. In a case where the print server in-charge 426 conforms to a host name of its own print server 301 (YES in step S1107), the processing proceeds to step S1108. In step S1108, the print server 301 executes the printing cancellation processing.

In the printing cancellation processing in step S1108, the print server 301 sets the status 414 of the job table 410 to "cancel-end" if the print data has not been transmitted. In a case where the print data is being transmitted, the print server 301 discontinues the transmission and sets the status 414 of the job table 410 to "cancel-end".

In step S1107, in a case where the print server in-charge 426 does not conform to a host name of its own print server 301 (NO in step S1107), the processing proceeds to step S1109. In step S1109, the print server 301 transfers the printing cancellation request to the print server in-charge 426. In other words, the print server 301 transfers the printing cancellation request to another print server 301 if the other print server 301 takes charge of the processing of the print job. Therefore, the other print server 301 executes the printing cancellation processing.

In step S1104, in a case where the status 414 is "transmitted" ("TRANSMITTED" in step S1104), the processing proceeds to step S1110. In step S1110, based on the job handle stored in the device job ID 415, the print server 301 sends a printing cancellation request to the device controller 510 of the printing device 106 identified by the device information acquired in step S1102. Then, the device controller 510 of that printing device 106 cancels the print job.

As described above, by appropriately managing the status of the print job, the print server 301 can promptly execute the printing cancellation processing by identifying a target to be notified of the printing cancellation request from among the own print server 301, another print server 301, and the printing device 106.

In step S1103, in a case where the scheduling mode 425 is the device scheduling mode ("DEVICE SCHEDULING MODE" in step S1103), the processing proceeds to step S1111. In step S1111, the print server 301 determines the status 414 of the job information acquired in step S1102. In step S1111, in a case where the status 414 is "printing" or "printing completed" ("PRINTING/PRINTING COMPLETED" in step S1111), the processing proceeds to step S1112. In step S1112, the print server 301 ends the processing by taking the printing cancellation request as an error, because the printing processing cannot be cancelled. In step S1111, in a case where the status 414 is "printing stand-by", ("PRINTING STAND-BY" in step S1111), the processing proceeds to step S1113. In step S1113, the print server 301 identifies the print server 301 in charge of the printing device 106 by referring to the print server in-charge 426. In step S1114, the print server 301 determines whether the own device(print server) is in charge of the printing device 106. In a case where the print server in-charge 426 conforms to a host name of its own print server 301 (YES in step S1114), the processing proceeds to step S1115. In step S1115, the print server 301 executes the printing cancellation processing.

In the printing cancellation processing of step S1115, the print server 301 sets the status 414 of the job table 410 to "cancel-end".

In step S1114, in a case where the print server in-charge 426 does not conform to a host name of its own print server 301 (NO in step S1114), the processing proceeds to step S1116. In step S1116, the print server 301 transfers the printing cancellation request to the print server in-charge 426. Then, the print server in-charge 426 of the printing device 106 executes the printing cancellation processing.

In step S1111, in a case where the status 414 is "scheduling stand-by", "transmitting", or "transmitted" ("SCHEDULING STAND-BY/TRANSMITTING/TRANSMITTED" in step S1111), the processing proceeds to step S1117. In step S1117, based on the device job ID 415, the print server 301 sends a printing cancellation request to the scheduling application 501 of the printing device 106. Then, the device controller 510 of that printing device 106 cancels the print job.

As described above, according to the differences in scheduling modes or print job statuses, the printing cancellation request can be sent to the print server 301, the scheduling application 501, or the device controller 510 as appropriate, and thus the printing processing can be cancelled promptly.

<Failure in Printing Cancellation Processing>

FIG. 12 is a flowchart illustrating processing executed by the print server 301 when the print server 301 fails in the printing cancellation request to the print server 301, the scheduling application 501, or the device controller 510 in step S1109, S1110, S1116, or S1117. In a case where the print server 301 fails in the printing cancellation request (NO in step S1202), the processing proceeds to step S1203. In step S1203, the print server 301 updates the cancel flag 417 of the job table 410 to "1". Even if the print server 301 fails in the printing cancellation request, the print job can be cancelled by checking processing of the cancel flag 417 in steps S802 and S804 of the printing processing of FIG. 8 executed by the print server 301.

According to the above-described exemplary embodiment, when a print server in a distributed processing-type printing system receives a printing cancellation request, the print server can execute the printing cancellation processing as appropriate by identifying a target to be notified of the printing cancellation request.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-084776, filed Apr. 16, 2014, which is hereby incorporated by reference herein in its entirety.

What is claimed is:

1. A print server in a printing system in which a load balancer executes processing for distributing requests to a plurality of print servers, the print server comprising:
 a receiving unit configured to receive a printing cancellation request from the load balancer;
 an acquisition unit configured to acquire information of a print job as a target of the printing cancellation request received by the receiving unit and information of a printing device;
 a determination unit configured to determine whether a status of the acquired print job is a first status where printing cancellation processing is to be executed by a print server in charge of the printing device, a second status where the printing cancellation processing is to be executed by the printing device, or a third status where the printing cancellation request is to be handled as an error; and
 a control unit configured to control the print server in charge of the printing device to execute the printing cancellation processing in a case where the determination unit determines that the status of the print job is the first status, control the printing device to execute the printing cancellation processing in a case where the determination unit determines that the status of the print job is the second status, and control the print server to send an error notification indicating that the printing cancellation processing cannot be executed in a case where the determination unit determines that the status of the print job is the third status.

2. The print server according to claim 1, further comprising a mode determination unit configured to determine whether a scheduling mode relating to transmission of print data is a server mode in which the print server manages the transmission of the print data or a device mode in which the printing device manages the transmission of the print data;
 wherein, in a case where the mode determination unit determines that the scheduling mode is the server mode, the first status is any of "printing stand-by", "scheduling stand-by", and "transmitting", the second status is "transmitted", and the third status is either "printing" or "printing completed", and
 wherein, in a case where the mode determination unit determines that the scheduling mode is the device mode, the first status is "printing stand-by", the second status is any of "scheduling stand-by", "transmitting", and "transmitted", and the third status is either "printing" or "printing completed".

3. The print server according to claim 1, wherein, in a case the determination unit determines that the status of the print job is the first status, the control unit determines whether a print server in charge of the printing device is own print server or another print server, and executes printing cancellation processing if the print server in charge is determined to be the own print server, and if the print server in charge is determined to be another print server, the control unit controls the own print server to transfer the printing cancellation request to the other print server to make the other print server execute the printing cancellation processing.

4. The print server according to claim 1, further comprising a flag setting unit configured to set a cancel flag to the print job in a case where the printing cancellation processing is in failure.

5. The print server according to claim 4, further comprising a printing processing unit configured to execute printing processing based on the print job,
   wherein the printing processing unit cancels the print job without executing the printing processing in a case where the cancel flag is set to the print job.

6. A control method of a print server in a printing system in which a load balancer executes processing for distributing requests to a plurality of print servers, the control method comprising:
   receiving a printing cancellation request from the load balancer;
   acquiring information of a print job as a target of the received printing cancellation request and information of a printing device;
   determining whether a status of the acquired print job is a first status where printing cancellation processing is to be executed by a print server in charge of the printing device, a second status where the printing cancellation processing is to be executed by the printing device, or a third status where the printing cancellation request is to be handled as an error; and
   controlling the print server in charge of the printing device to execute the printing cancellation processing in a case where the determining determines that the status of the print job is the first status, controlling the printing device to execute the printing cancellation processing in a case where the determining determines that the status of the print job is the second status, and controlling the print server to send an error notification indicating that the printing cancellation processing cannot be executed in a case where the determining determines that the status of the print job is the third status.

7. A non-transitory computer readable storage medium storing a program causing a computer to function as a print server in a printing system in which a load balancer executes processing for distributing requests to a plurality of print servers, wherein the program causes the computer to function as:
   a receiving unit configured to receive a printing cancellation request from the load balancer;
   an acquisition unit configured to acquire information of a print job as a target of the printing cancellation request received by the receiving unit and information of a printing device;
   a determination unit configured to determine whether a status of the acquired print job is a first status where printing cancellation processing is to be executed by a print server in charge of the printing device, a second status where the printing cancellation processing is to be executed by the printing device, or a third status where the printing cancellation request is to be handled as an error; and
   a control unit configured to control the print server in charge of the printing device to execute the printing cancellation processing in a case where the determination unit determines the status of the print job is the first status, control the printing device to execute the printing cancellation processing in a case where the determination unit determines that the status of the print job is the second status, and control the print server to send an error notification indicating that the printing cancellation processing cannot be executed in a case where the determination unit determines that the status of the print job is the third status.

* * * * *